United States Patent [19]

Bement et al.

[11] Patent Number: 5,064,111
[45] Date of Patent: Nov. 12, 1991

[54] PERMANENT WIRE SPLICING BY AN EXPLOSIVE JOINING PROCESS

[75] Inventors: Laurence J. Bement, Newport News; Anne C. Kushnick, Williamsburg, both of Va.

[73] Assignee: The United States of America as represented by the Administrator of the National Aeronautics and Space Administration, Washington, D.C.

[21] Appl. No.: 591,645

[22] Filed: Oct. 2, 1990

[51] Int. Cl.⁵ .............................................. B23K 20/08
[52] U.S. Cl. ...................................... 228/107; 228/2.5
[58] Field of Search ................ 228/107, 108, 109, 2.5; 29/421.2; 72/706

[56] References Cited

U.S. PATENT DOCUMENTS

| 2,131,766 | 10/1938 | Temple, Jr. | 228/107 |
| 2,494,137 | 1/1950 | Martines | 228/108 |
| 4,708,280 | 11/1987 | Bement et al. | 228/107 |

FOREIGN PATENT DOCUMENTS

| 615993 | 3/1961 | Canada | 228/107 |
| 2007400 | 1/1970 | France | 228/107 |

*Primary Examiner*—Samuel M. Heinrich
*Attorney, Agent, or Firm*—George F. Helfrich

[57] ABSTRACT

The invention is an apparatus and method for wire splicing using an explosive joining process. The apparatus consists of a prebent, U-shaped strap of metal that slides over prepositioned wires. A standoff means separates the wires from the strap before joining. An adhesive means holds two ribbon explosives in position centered over the U-shaped strap. A detonating means connects to the ribbon explosives. The process involves spreading strands of each wire to be joined into a flat plane. The process then requires alternating each strand in alignment to form a mesh-like arrangement with an overlapped area. The strap slides over the strands of the wires, and the standoff means is positioned between the two surfaces. The detonating means then initiates the ribbon explosives that drive the strap to accomplish a high velocity, angular collision between the mating surfaces. This collision creates surface melts and collision bonding results in electron-sharing linkups.

18 Claims, 2 Drawing Sheets

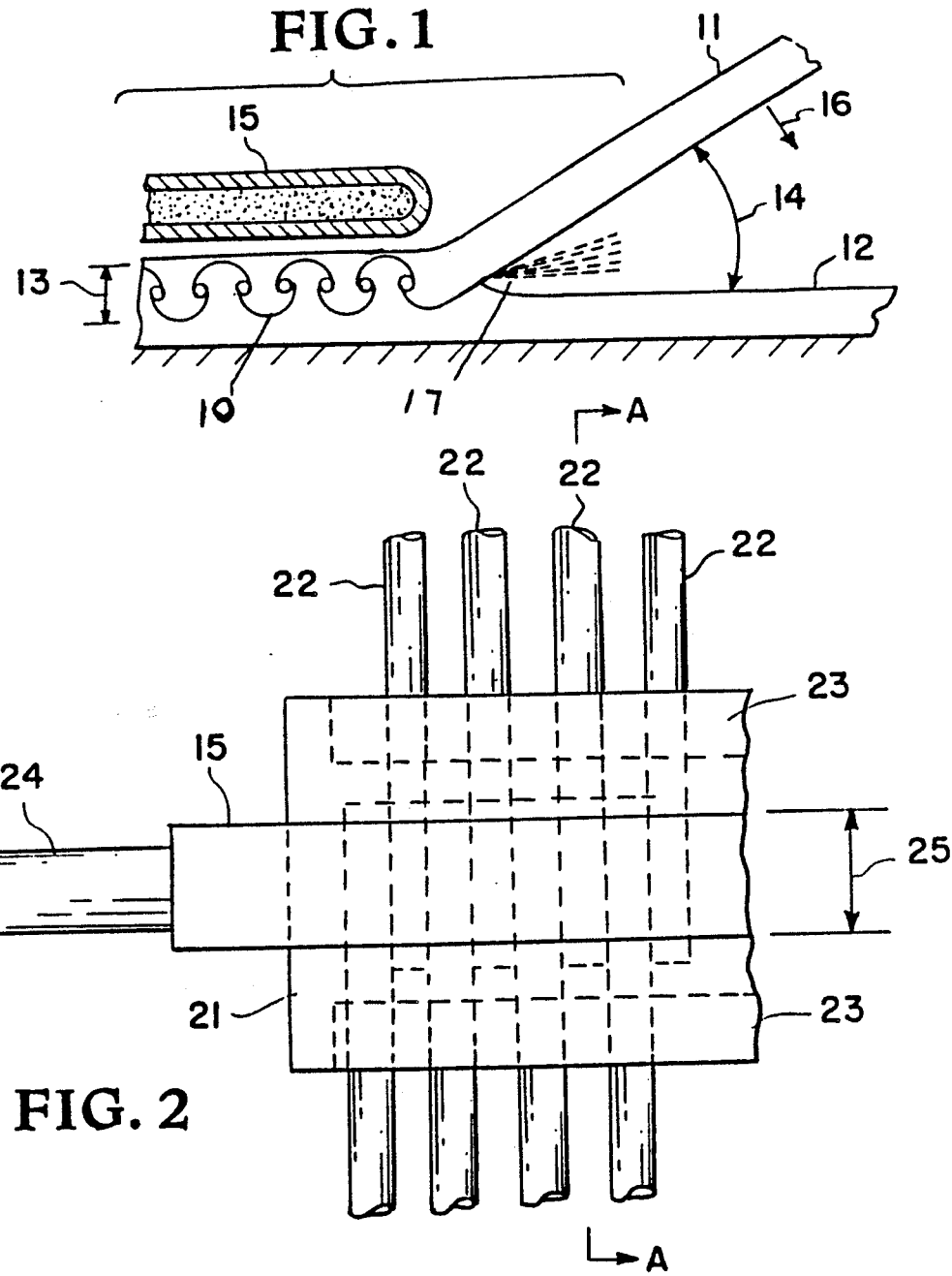
FIG. 1
FIG. 2
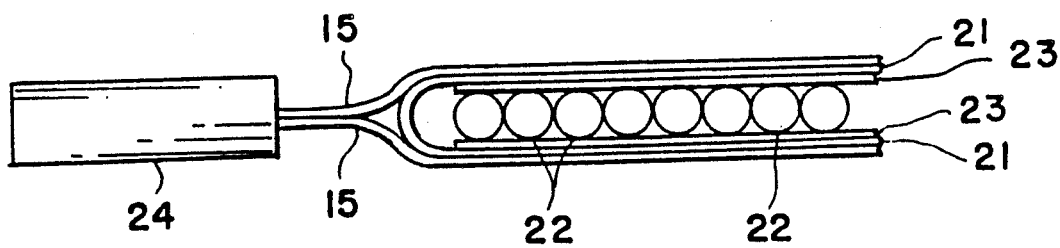
FIG. 3

PERMANENT WIRE SPLICING BY AN EXPLOSIVE JOINING PROCESS

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

This invention relates to metal bonding using explosive energy. More specifically, the invention is an apparatus and method for wire splicing using an explosive joining process.

2. Description of the Related Art

Demand is increasing within the electrical industry for highly reliable metal joining of conductor wire providing physically and electrically integral bonds suitable for the geometries and working conditions encountered under wire joining. Interest also exists in remote metal joining of wire with metallurgically pure bonds for inaccessible operations such as assembly of structures in space. Prior art methods in cable manufacturing facilities include splicing conductor wires by a high-temperature joining process such as brazing. Annealing subsequently results and weakens the wires adjacent to the joints. Brazing also has the disadvantages of requiring skilled operators and prolonging installment time.

Explosive joining offers characteristics to satisfy both the demand in physically and electrically integral bonds and the interest in remote metal joining. This type of joining produces metallurgical bonds that do not deteriorate the wires in the area adjacent to the splice. Instead, the explosive joining process creates a high velocity, angular collision between the metal surfaces which causes formation of interatomic, electron-sharing linkups.

Previous methods of explosive joining for wire splicing, however, fail to disclose any method or apparatus that provides a reliably strong metallurgical bond for the connection of multi-strand wires with relatively easy assembly. For example, the prior art disclosed in U.S. Pat. No. 3,995,741 by Hofer anticipates the connection of multi-wire cables and braids but does not ensure a good metallurgical bond in each strand. Further, Hofer requires the gluing of a welded cartridge and the fitting of a sleeve over another sleeve during its time-delaying assembly. The prior art disclosed in U.S. Pat. No. 4,057,187 by Cranston et al, on the other hand, does not even disclose or suggest bonding of multi-strand wire for its device with a coaxial arrangement. Cranston also requires layering an explosive mixture upon a ferrule and then applying a protective coating over this explosive layer. Thus, Cranston also requiers a time-consuming assembly.

Previous methods of explosive joining are also limited because they require using relatively large amounts of explosive which present problems in safe handling and accurate operation. For example, Cranston recommends use of a primary explosive in a mixture necessitting experimentation to determine the amount and thickness of the explosive layer required to obtain a desirable metallurgical bond. Further, impacts, electrical shocks, heat, and fire could unintentionally ignite the primary explosive, thereby increasing the hazards of handling and operation. Large amounts of explosive may also result in damage to thin wires.

SUMMARY OF THE INVENTION

The present invention is an apparatus and process for miniaturized explosive joining of two or more pre-positioned metallic wires.

An object of the present invention is to provide a means of explosive joining of wires that has no limitations on the width of the wires or the number of strands.

Yet another object of the present invention is to provide a means of explosive joining of wires with repeatable and precise locations of the explosive joint.

A further object of the present invention is to provide a means of explosive joining of wires which minimizes the amount of explosive required.

Still another object of the present invention is to provide a means of explosive joining which reduces damaging pressure waves, noise nuisance and damage to surrounding structures.

The present invention attains the foregoing and additional objects by providing an apparatus and process for wire splicing using explosve joining. The apparatus consists of a prebent U-shaped strap of a plate of metal that bonds to wires to be spliced. A standoff means such as tape separates the wires from physical contact with the strap. An adhesive means holds a ribbon explosive in position over each side of the strap. A detonating means initiates the ribbon explosives.

The process involves spreading the strands of the wires to be spliced into a flat plane and then alternating in alignment each strand of each wire to form a mesh-like arrangement with the strands overlapping each other. A plate of metal is cut and bent into a U-shaped strap. The strap then slides over the prepositioned wires. The adhesive means then holds the ribbon explosives to the middle of each side of the strap. The detonating means is mated to the ribbon explosives and then ignited to effect an explosive joining of the wires.

BRIEF DESCRIPTION OF THE DRAWINGS

FIG. 1 is a cross-sectional view of half of the explosive physical process of the present invention exaggerating joint depth and impact angles for illustrative purposes;

FIG. 2 is a top view of an apparatus for explosive wire splicing in completed assembly prior to detonation;

FIG. 3 is a front view of the apparatus in completed assembly demonstrating an arrangement of a detonating means with two ribbon explosives;

DETAILED DESCRIPTION OF THE PREFERRED EMBODIMENT

Figure 4:
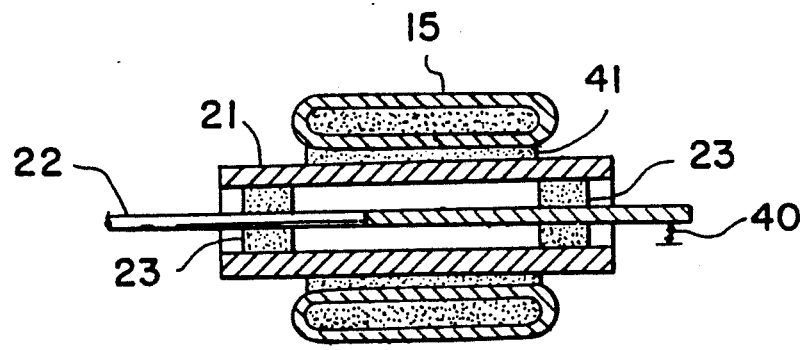
FIG. 4 is a cross-sectional side view of the apparatus in FIG. 2 taken along lines A—A showing the positioning of an adhesive means and a standoff means.

The present invention involves a physical process half of which is depicted in FIG. 1, exaggerating for illustrative purposes the operation of an explosive joint 10 with a surface interaction depth 13 and an optimum high velocity collision angle 14 between metals 11 and 12. Explosive charge 15 is a ribbon explosive, such as a high energy sheathed miniature explosive, a lead-sheathed cyclotrimethylene-trinitramine (RDX), or any secondary explosive, that generates several million pounds of pressure per square inch on top of the metal 11. This pressure creates velocities 16 in metal 11 of several thousand feet per second. Upon impact with metal 12, the kinetic energy of metal 11 converts to create skin-deep (approximately 0.001 inch) melts with metal 12 by stripping the surfaces and squeezing them out in jet action at the optimum high velocity collision angle 14. In other words, the process is a cold-working process which does not effect the parent metal properties. The joints created by this process exhibit a high degree of physical uniformity in terms of surface, area, and thickness worked by the explosive pressure, in bond areas, and in joint strengths.

Variables that affect the explosive joining process and the collision angle include the thickness, the density, and the malleability of the metal 11, as well as the size and physical properties of the metal 12 to be joined. The optimum high velocity collision angle 14 maximizes the explosive joining process.

As shown in the completed assembly of FIG. 2, a preferred embodiment of the present invention comprises a prebent U-shaped strap 21 of a plate of metal, a standoff means 23 separating the strands 22 of wire from the strap 21 and ribbon explosives 15 positioned over each side of strap 21. As demonstrated in FIG. 3, the present invention further comprises a detonating means 24 such as a blasting cap mated to the two ribbon explosives 15. An adhesive means 41 holds the ribbon explosives 15 in position over strap 21, as illustrated in FIG. 4.

Figure 5:
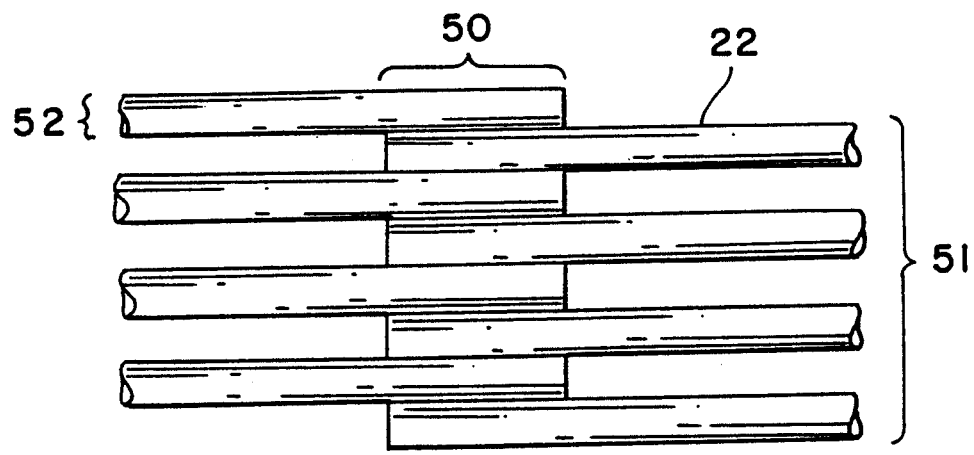
FIG. 5 is a view of wires to be spliced indicating an overlapped, meshlike arrangement.

Referring to FIG. 5, the process of the present invention begins by spreading the strands of the wires to be joined into a flat plane. Each wire is then arranged in parallel with an opposing wire, and each strand of each wire is alternated in alignment to form a mesh-like arrangement, with the strands forming an area of overlapping 50 as depicted in FIG. 5. Complete alternate positioning of the strands, however, is not required. This overlap 50 assures metallurgical bonding of the multi-strand wire and creates a cross-sectional area that exceeds the cross-sectional area of wire 22. Thus, the overlap maintains the mechanical integrity of the wire and lowers the electrical resistance across the joint. Width 51 of the aligned strands may be as small as approximately 0.04 inch and has no upper limit.

Next, a plate of metal such as copper is cut to a length approximately equal to twice the width 51 of aligned strands plus twice the diameter 52 of strand 22. The width of the plate must at least be greater than the width of overlap 50 and preferably should also be greater than the width of the ribbon explosive 15, which is typically 0.330 inch. A width greater than the width of the ribbon explosive will ensure a good metallurgical bond.

Figure 6:
FIG. 6 is a side view demonstrating a metal plate bent into a U-shaped configuration.

The plate of metal, as demonstrated in FIG. 6, is bent into a U-shaped strap 21 such that the spacing 61 is greater than the diameter 52 of strand 22. Referring to FIG. 2, strap 21 is then slid over the prepositioned strands of wire. The U-shaped strap 21 eliminates the need of a coaxial arrangement of the wires and provides an easy and simple assembly that requires minimal training.

Referring to FIG. 4, a standoff 40 or separation between the strap 21 and strands 22 is required to achieve the high velocity, angular collision necessary to effect the explosive joint 10. A standoff means 23, such as masking tape or any other convenient shim, accomplishes this necessary standoff 40 to prevent physical contact between the strap and the strands. Minimum standoff, approximately 0.010 inch, achieves the required velocity to effect an explosive joint. Maximum standoff, approximately 0.025 inch, minimizes material deformation and pending energy losses.

After placement of the standoff means 23, on adhesive means 41, such as double-backed tape, is positioned and attached to the center of strap 21 on each side as shown in FIG. 4. The adhesive means 41 locates the ribbon explosives and provides an energy transfer medium between the ribbon explosive and the strap. The adhesive means 41 also protects the strap from lead embedment generated by the ribbon explosive. The ribbon explosive 15 is then cut to an appropriate length for the explosive joint 10.

Referring to FIG. 3, the appropriate length of ribbon explosive 15 extends beyond the length of strap 21 to allow for assembly with detonating means 24. The ribbon explosive 15 is then centered over the adhesive means 41 and pressed onto it, as illustrated in FIGS. 2 and 4, to secure a bonded position around strap 21.

Preferably, explosive ribbons are placed on both sides of strap 21 and initiated simultaneously to generate symmetrically opposed forces and to minimuze or eliminate offsetting forces generated during explosion of the ribbons. An alternative embodiment, however, would position the ribbon explosive on only one side of strap 21 and then lay the other side of strap 21 upon a shock absorbing means such as an anvil to maximize joining efficiency by reducing deformations.

After positioning the ribbon explosive 15, the detonating means 24 is mated to the ribbon explosives 15 as shown in FIGS. 2 and 3. The detonation area 25 extends simultaneously across the complete cross-section width of the ribbon explosive 15 to attain minimum pressure and thereby cause the explosion to be self-sustaining. The detonating means 24 initiates the ribbon explosive 15, and firing of the explosive drives strap 21 downward and upward into the strands 22 to accomplish an explosive joint 10.

Electric blasting caps containing hot bridge wires may be used to initiate the explosive and require approximately 0.1 joule. Such blasting caps must use electrical shielding, grounding, and fail-safe firing systems. Alternatively, a number of aerospace approaches for initiation, such as exploding bridge wires, mechanically actuated percussion primers, explosive transfer lines, or lasers may serve as a detonating means 24 and do not present as hazardous a set of conditions as electric blasting caps.

With regard to safety, routine handling and cutting by personnel, as well as electrical inputs, do not initiate the RDX ribbon explosive. Alternatively, other explosive materials that are insensitive to rifle fire and lighting, such as dipicramide, may be used. Dipicramide is stable to 450° F. for 50 hours, and will burn with low energy output, but will not detonate. Volume shielding can easily contain any explosive by-products such as lead fragments, pressure wave, and carbon-particle smoke. Because only small quantities of explosive are used, the explosive pressure attenuates to less than one pound per square inch within the first foot of distance from the source.

The ribbon explosive 15 produces all the energy necessary to create explosive joint 10. With the ribbon manufactured to exacting standards, the explosive load varies less than five percent down the length. Thus, the explosive joints vary little once the joining parameters are established.

The wire size establishes the parameters of the joining process. For example, a 0.025 inch wire uses a 0.030 inch plate of copper prebent to accomodate the size of the strands of wire and provide two 0.035 inch standoffs. The size of the ribbon explosive is 20 grains/foot. A 0.090 inch wire also uses a 0.030 inch plate of copper prebent to accomodate wire size and two 0.035 inch standoffs. The wire size of the ribbon explosive used in this case is 30 grains/foot. The total amount of explosive used in the second arrangement for a 1.5-inch width splice is less than one gram.

A particular advantage of the present invention is that the number of wires and of strands are not limited. Another advantage of the present invention is that the strap and the wires can comprise the same or different metallic elements or alloys. In other words, the strap may or may not comprise the same material as the other wire.

While specific embodiments of the invention have been described herein, they are only exemplary of the novel feature of the invention and are not exhaustive. Many variations and modifications of these specific examples will be readily apparent to those skilled in the art in light of the above teachings without departing from the scope of the appended claims. This invention may be practiced otherwise than as specifically described herein.

What is claimed as new and desired to be secured by Letters Patent of the United States is:

1. An apparatus for miniaturized explosive joining of two or more prepositioned metallic wires having at least one strand each, comprising:
   (a) a prebent U-shaped strap of a plate of metal bonding to the wires;
   (b) a standoff means separating the wires from the strap;
   (c) a ribbon explosive positioned over each side of the strap;
   (d) an adhesive means holding the ribbon explosive in position over the strap; and
   (e) a detonating means initiating the ribbon explosives.

2. An apparatus for miniaturized explosive joining of two or more prepositioned metallic wires as in claim 1 wherein the ribbon explosive is a high energy sheathed miniature explosive.

3. An apparatus for miniaturized explosive joining of two or more prepositioned metallic wires as in claim 1 wherein the ribbon explosive is a miniature ribbon of miniature lead-sheathed cyclotrimethylene trinitramine.

4. An apparatus for miniaturized explosive joining of two or more prepositioned metallic wires as in claim 1 wherein the ribbon explosive is a secondary explosive.

5. An apparatus for miniaturized explosive joining of two or more prepositioned metallic wires as in claim 1 wherein the plate of metal is made of copper.

6. An apparatus for miniaturized explosive joining of two or more prepositioned metallic wires as in claim 1 wherein the wires and the strap are made of different material.

7. An apparatus for miniaturized explosive joining of two or more prepositioned metallic wires as in claim 1 wherein the wires are made of different material.

8. An apparatus for miniaturized explosive joining of two or more prepositioned metallic wires as in claim 1 wherein the standoff means is tape.

9. A process for miniaturized explosive joining of two or more metallic wires which minimizes the quantity of explosives used and reduces damaging pressure waves and noise, comprising;
   (a) spreading strands of the wires to be joined into a flat plane;
   (b) alternating in alignment each strand of each wire to form a mesh-like arrangement, with the strands having an area of overlap;
   (c) cutting a plate of metal to a length moderately longer than twice the width of the arrangement of aligned strands;
   (d) bending the plate of metal into a U-shaped strap;
   (e) sliding the strap over the prepositioned strands of wire;
   (f) providing a standoff means between the strands of wire and the strap to separate the strands from the strap;
   (g) bonding a ribbon explosive to the middle of each side of the strap with an adhesive means;
   (h) mating the ribbon explosives to a detonating means so the detonation area extends across the complete width of the ribbon explosives; and
   (i) initiating the ribbon explosives with the detonating means to effect an explosive joining that does not affect adjacent metal properties.

10. A process for miniaturized explosive joining of two or more metallic wires as in claim 9 wherein the ribbon explosives are a high energy sheathed miniature explosive.

11. A process for miniaturized explosive joining of two or more metallic wires as in claim 9 wherein the ribbon explosives are a miniature ribbon of miniature lead-sheathed cyclotrimethylene trinitramine.

12. A process for miniaturized explosive joining of two or more metallic wires as in claim 9 wherein the ribbon explosives are a secondary explosive.

13. A process for miniaturized explosive joining of two or more metallic wires as in claim 9 wherein the plate of metal is made of copper.

14. A process for miniaturized explosive joining of two or more metallic wires as in claim 9 wherein the wires and the strap are made of the same material.

15. A process for miniaturized explosive joining of two or more metallic wires as in claim 9 wherein the material of the wires differs from that of the strap.

16. A process for miniaturized explosive joining of two or more metallic wires as in claim 9 wherein the wires are made of different material.

17. A process for miniaturized explosive joining of two or more metallic wires as in claim 9 wherein the standoff means is tape.

18. A process for miniaturized explosive joining of two or more wires as in claim 9 steps (a)–(f) further comprising:
   (a) bond a ribbon explosive to the middle of one side of the strap with an adhesive means;
   (b) positioning the other side of the strap upon a shock absorbing means;
   (c) mating the ribbon explosive to a detonating means so the detonation area extends across the complete width of the ribbon explosive; and
   (d) initiating the ribbon explosive with the detonating means to effect an explosive joining that does not affect adjacent metal properties.

* * * * *